(12) United States Patent
Schierling et al.

(10) Patent No.: US 6,437,467 B1
(45) Date of Patent: Aug. 20, 2002

(54) DRIVE SYSTEM

(75) Inventors: Bernhard Schierling, Kürnach;
Alexander Manger, Grettstadt;
Benedikt Schauder, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/658,123

(22) Filed: Sep. 8, 2000

(30) Foreign Application Priority Data

Sep. 9, 1999 (DE) .......................... 199 43 037

(51) Int. Cl.[7] .......................... F02N 11/00; F16F 15/10; H02K 7/00
(52) U.S. Cl. ...................... 310/51; 310/75 R; 180/65.2; 74/574
(58) Field of Search .................. 310/51, 102 R, 310/92, 93, 96, 75 R; 180/65.1, 65.2; 188/381; 74/574; 192/206; 267/259, 25

(56) References Cited

U.S. PATENT DOCUMENTS 5,185,543 A * 2/1993 Tebbe ........................ 310/51
5,518,100 A * 5/1996 Birk et al. ................ 192/208
5,755,302 A * 5/1998 Lutz et al. ............... 3180/65.2
5,927,452 A * 7/1999 Freise et al. ................. 310/74

FOREIGN PATENT DOCUMENTS

DE    19631384 C1    10/1997    ............ H02K/7/00

* cited by examiner

*Primary Examiner*—Burton S. Mullins
(74) *Attorney, Agent, or Firm*—Cohen, Pontani, Lieberman & Pavane

(57) ABSTRACT

A drive system for a motor vehicle includes an electric machine arranged for driving a driveshaft of a drive unit and obtaining electrical energy during rotation of the driveshaft. The electric machine has a stator arrangement and a rotor arrangement which is connectable to the driveshaft for common rotation. The rotor arrangement is connectable to the driveshaft via an elastic connecting arrangement.

18 Claims, 7 Drawing Sheets

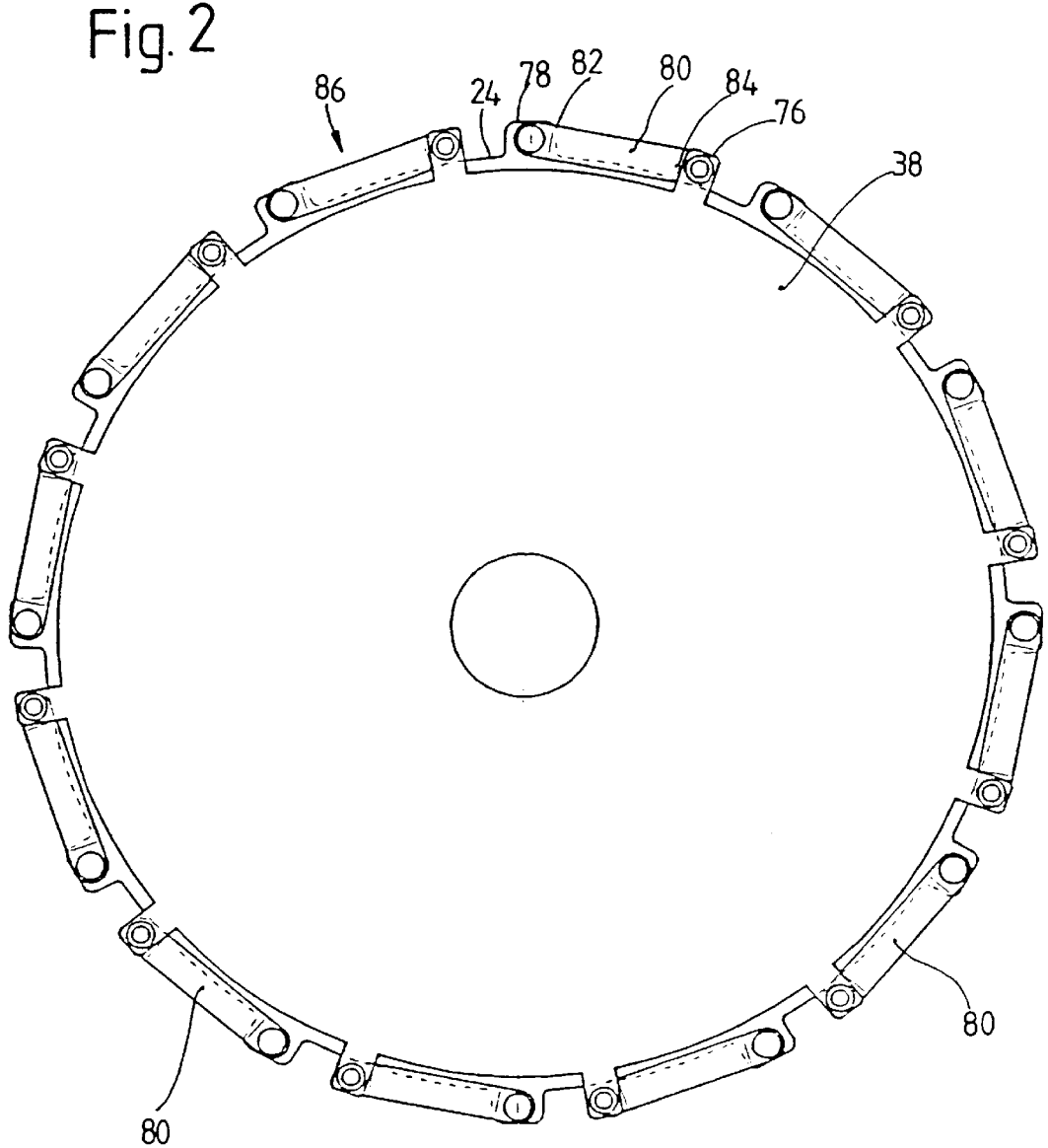

DRIVE SYSTEM

BACKGROUND OF THE INVENTION

1. Field of the Invention

The present invention relates to a drive system for a motor vehicle including an electric machine for rotating a driveshaft of a drive unit and/or obtaining electrical energy from the driveshaft when the driveshaft is rotating, the electric machine having a stator arrangement and a rotor arrangement which is connected or connectable to the driveshaft for common rotation about an axis of rotation.

2. Description of the Related Art

German reference DE 198 31 384 C1 discloses a drive system with an electric machine arranged in the drive train of a drive unit for driving a drive shaft and for obtaining electrical energy from the drive shaft during rotation of the drive shaft. In this reference, the electric motor includes a rotor permanently connected to the crankshaft of the drive unit via a support. If wobbling movements induced by individual piston strokes of a drive unit occur in the region of the crankshaft which projects from the drive unit, these wobbling movements are transmitted to the rotor of the electric motor by the support. The rotor will execute a corresponding wobbling movement which changes the air gap provided between the rotor and the stator. The changes in the air gap alter the operating characteristics of the electric motor, particularly in the generator mode. Accordingly, wobbling movements of the drive shaft produce nonuniform operating characteristics.

SUMMARY OF THE INVENTION

It is the object of the invention to provide a drive system for a motor vehicle in which fluctuations in the operating characteristics of an electric machine induced by nonuniformities of movement are avoided.

This object is achieved according to the present invention by a drive system for a motor vehicle comprising an electric machine arranged for driving a drive shaft and/or obtaining electric energy from the drive shaft when the drive shaft is rotating. The electric machine has a stator arrangement and a rotor arrangement connected or connectable to the driveshaft for common rotation about an axis of rotation.

The rotor arrangement of the electric motor is connected to the driveshaft via an elastic connecting arrangement.

The elastic connecting arrangement between the rotor arrangement and the driveshaft allows the rotor arrangement to be centered with reference to the stator arrangement independently of an instantaneous position of movement of the driveshaft. Accordingly, the rotor arrangement can thus assume the position suitable for operating the electric machine. This self-centering is also essentially not impaired by wobbling movements present in the driveshaft to which the rotor arrangement is connected via the elastic connection.

The elastic connecting arrangement may include at least one elastically deformable connecting element. For reasons of efficient use of space, it is advantageous when the at least one elastically deformable connecting element supports the rotor arrangement in a first end region, and is constructed at a second end region for connection to the driveshaft.

In a further embodiment according to the present invention, the connecting arrangement comprises an elastically deformable connecting element constructed essentially like a disk. A radially external first end region of the disk bears the rotor arrangement and the radially internal second end region of the disk is constructed for connection to the driveshaft.

In an alternative embodiment according to the present invention, the elastic connecting arrangement may comprise a plurality of elongated connecting spring elements arranged in succession in the circumferential direction as elastically deformable connecting elements having first end regions connected to the rotor arrangement and second end regions for connection to the driveshaft.

Moreover, a drive system according to the present invention may comprise a simple design when the second end region of the at least one elastically deformable connecting element is constructed for essentially direct connection to the driveshaft.

As an alternative, the second end region of the at least one elastically deformable connecting element may be connected to the driveshaft via a supporting arrangement.

This type of configuration is particularly advantageous when the connecting arrangement comprises a plurality of elastically deformable connecting elements.

The supporting arrangement may comprise connecting sections which extend into a radial region in which the first end regions of the elastically deformable connecting elements are connected to the rotor arrangement. In this embodiment, the elastically deformable connecting elements extend essentially in the circumferential direction. However, the supporting arrangement may alternatively have connecting sections which are assigned to the elastically deformable connecting elements, wherein the connecting sections are situated radially inside a radial region in which the elastically deformable connecting elements are connected at their first end region to the rotor arrangement. In this alternative embodiment, the elastically deformable connecting elements extend radially and in the circumferential direction. This type of configuration allows the supporting arrangement to be constructed with a very simple design.

For example, the supporting arrangement may comprise a torsional vibration damper arrangement with a cover plate at which the connecting sections are provided.

In accordance with a further embodiment, the drive system according to the present invention may be constructed so that the rotor arrangement is connected or connectable to the driveshaft via a torsional vibration damper arrangement. In this embodiment, the elastically deform able connecting arrangement is provided in a region of the connection of the torsional vibration damper arrangement to the driveshaft. In this embodiment, the elasticity is situated essentially between the driveshaft and the torsional vibration damper arrangement. Accordingly, the torsional vibration damper may be decoupled with regard to the wobbling movements which may potentially occur in the region of the driveshaft.

The torsional vibration damper arrangement may comprise an elastically deformable connecting element for connecting the torsional vibration damper arrangement to the driveshaft. This elastically deformable connecting element may be constructed, for example, with a deformation region arranged in the shape of a tube. In this case, the required elasticity may be obtained in a simple way by constructing a deformation slit arrangement in the deformation region. The deformation slit arrangement comprises a plurality of deformation slits which preferably extend in the circumferential direction and follow one another axially or/and in the circumferential direction. It may be pointed out here that the tube-like deformation region may, of course, be constructed as a bellows with a corrugated wall structure providing the required elasticity.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views:

FIG. 2 is a partial axial view of the drive system illustrated in FIG. 1 showing the region in which a rotor arrangement is connected to a torsional vibration damper arrangement;

DETAILED DESCRIPTION OF THE PRESENTLY PREFERRED EMBODIMENTS

Figure 1:
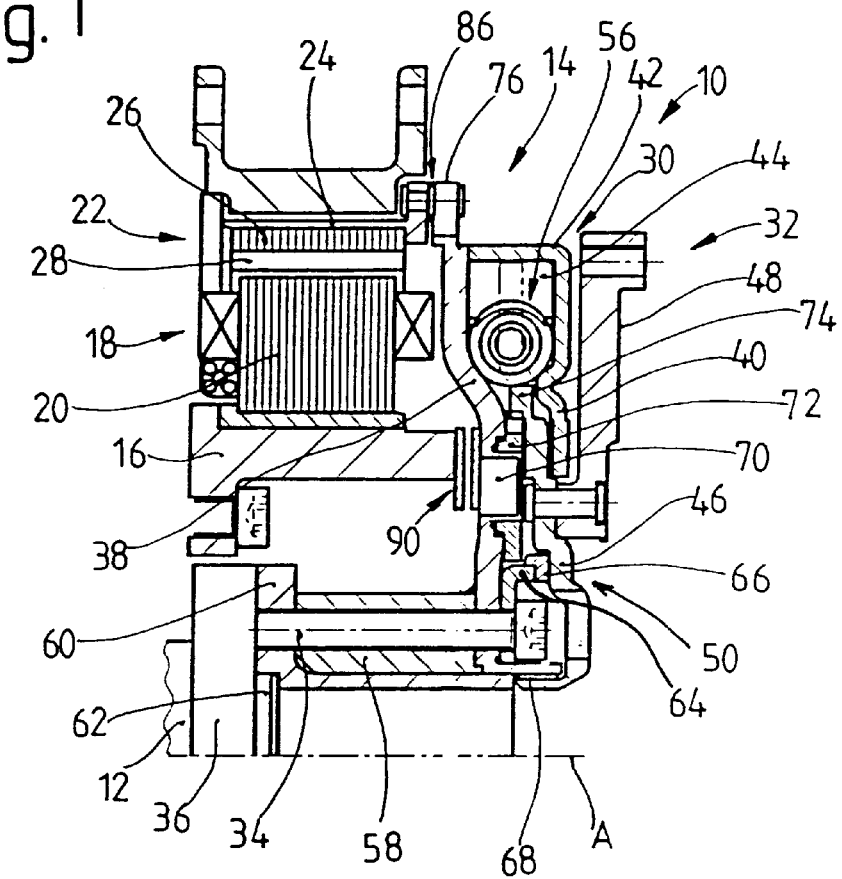
FIG. 1 is a partial longitudinal sectional view of a first embodiment of the drive system according to the present invention.

FIGS. 1 and 2 show a first embodiment of a drive system 10 according to the present invention which forms a starter/generator arrangement for an internal combustion engine (not illustrated). During starter operation of the drive system 10, a driveshaft such as a crankshaft 12 of the internal combustion engine is driven to rotate to start the drive unit, i.e., the internal combustion engine. During generator operation of the drive system 10, electric energy is obtained in the rotary mode of the drive unit and fed into an electric system or a storage battery.

The drive system 10 comprises an electric machine 14 having a stator arrangement 18 supported, for example, on the drive unit by a stator support 16 with a plurality of stator coils 20. The electric machine 14 also has a rotor arrangement 22 with a rotor body 24 with a plurality of rotor laminations 26 supported on an inner circumferential surface of the rotor body 24, the plural rotor laminations 26 being arranged, for example, in an annular shape. The rotor laminations 26 form a rotor yoke for a permanent magnet 28 supported on an inner circumferential surface of the rotor yoke. Accordingly, the electric machine 14 is a synchronous external-rotor machine with a permanently excited rotor. The rotor body 24 is connected to a primary side 30 of a torsional vibration damper arrangement 32 so that the rotor body 24 rotates with the primary side 30 of a torsional vibration damper arrangement 32. This primary side 30 of the torsional vibration damper arrangement 32 is fixed on a shaft flange 36 of the crankshaft 12 via a plurality of fastening screws 34. The primary side 30 of the torsional vibration damper arrangement 32 comprises two cover plate elements 38, 40. The cover plate element 40 is constructed like a pot and comprises a radially external region 42 which extends essentially axially relative to the axis of rotation A and is connected, for example, by welding to the cover plate element 38. A central disk element 46 engages in the annular space 44 formed between the cover plate elements 38, 40. The central disk element 46 forms a secondary side 50 of the torsional vibration damper arrangement 32 together with a flywheel mass 48. The flywheel mass 48 may, for example, be fixed to a pressure plate assembly of a friction clutch and may alternatively be connected directly to a transmission input shaft. The central disk element 46 is fixedly connected to the flywheel mass 48 by riveting or other mechanical connection radially inside the cover plate element 38.

A damper spring arrangement 56 is arranged between the primary side 30, i.e., the cover plate element 38, 40, and the secondary side 50, i.e., the central disk element 46, having damper springs or groups of damper springs supported in the circumferential direction on the primary side 30 and the secondary side 50 of the torsional vibration damper arrangement 32, thereby permitting relative rotation between the primary side 30 and secondary side 50 against the compression of the springs of the damper spring arrangement 56. The support on the primary side 30 or secondary side 50 for the damper spring arrangement 56 may comprise spring seats or sliding shoes which slide on the axially extending section 42 of the cover plate element 40.

A radially inner region of the cover plate element 38 is permanently connected to a spacing sleeve 58, for example, by welding. A centering sleeve 60 centered on a centering projection 62 of the crankshaft 12 is also provided for guiding the spacing sleeve 58 when the assembly formed from the torsional vibration damper arrangement 32 and rotor arrangement 22 is brought up to the crankshaft 12. The centering sleeve prevents the rotor arrangement 22 from contacting the stator arrangement 18. The spacing sleeve 58 and the centering element 60 are penetrated by the screw bolts 34 via which the cover plate element 38 and the primary side 30 of the torsional vibration damper arrangement 32 are fixed on the shaft flange 36.

In the radially inner region of the torsional vibration damper arrangement 32, an annular bearing element 64 is fixed via the screw bolts 34 against the cover plate element 38. The central disk element 46 is axially supported on the annular bearing element 64 with the interposition of an axial friction bearing 66. The radial bearing of the primary side 30 with reference to the secondary side 50 is performed by a rolling bearing or friction bearing 68 positioned between two cylindrical sections of the cover plate element 38 and the central disk element 46, respectively, each cylindrical section extending essentially axially. Furthermore, a plurality of pot-like projections 70 are constructed on the cover plate element 38 with a planet gear 72 rotatably mounted on each pot-like projection 70. The planet gear 72 engages with a tooth system 74 which is arranged on the central disk element 46 and formed by shaping. The tooth system 74 drives the planet gears 72 to rotate as an internal-geared wheel in conjunction with relative rotation between the primary side 30 and secondary side 50. Since the annular space 44 is filled with viscous fluid, the planet gears 72 rotate in the viscous medium and the displacement of the latter leads to dissipation of vibrational energy.

The drive system 10 according to the present invention may also include a rotary position transmitter 90 which detects the rotary position of either the torsional vibration damper arrangement 32 or the rotor arrangement 22, the rotary position being important, in particular, for the commutation of the stator coils 20.

The connection of the rotor arrangement 22 to the torsional vibration damper arrangement 32 is illustrated in FIG. 2. A plurality of connecting sections 76 are arranged on the radially external region of the cover plate element 38 in succession in the circumferential direction and extend radially outwards. A plurality of mating connecting sections 78 are constructed on the rotor body 24 extending radially outwards and corresponding to the plural connection sections 76. A leaf spring 80 extends approximately in the circumferential direction between each pair of a connecting section 76 and a mating connecting section 78. A first end region 82 of each of the leaf spring elements 80 is fixed on the mating connecting sections 78 by riveting or other mechanical connection and a second end region 84 of each of the leaf spring elements 80 is fixed on the connecting sections 76 by riveting or other mechanical connection. The plural leaf spring elements 80 together form an elastic connecting arrangement 86 via which the rotor arrangement 22 is connected to the torsional vibration damper arrangement 32 and thus to the crankshaft 12.

This elastic connecting arrangement 86 between the rotor arrangement 22 and torsional vibration damper arrangement 32 ensures that wobbling movements occurring in the region of the crankshaft 12 which are also transmitted to the primary side 30 by the essentially rigid joining of the primary side 30 of the torsional vibration damper arrangement 32 to the crankshaft 12 are decoupled relative to the rotor arrangement 22. This decoupling allows the rotor arrangement 22 to center itself with reference to the stator arrangement 18 on the basis of the magnetic forces present. Thus, wobbling movements occurring in rotary operation therefore do not cause a relatively large variation in the air gap provided between the rotor arrangement 22 and the stator arrangement 18, which would entail a severe impairment of the operating characteristic of the electric machine 14.

Figure 3:
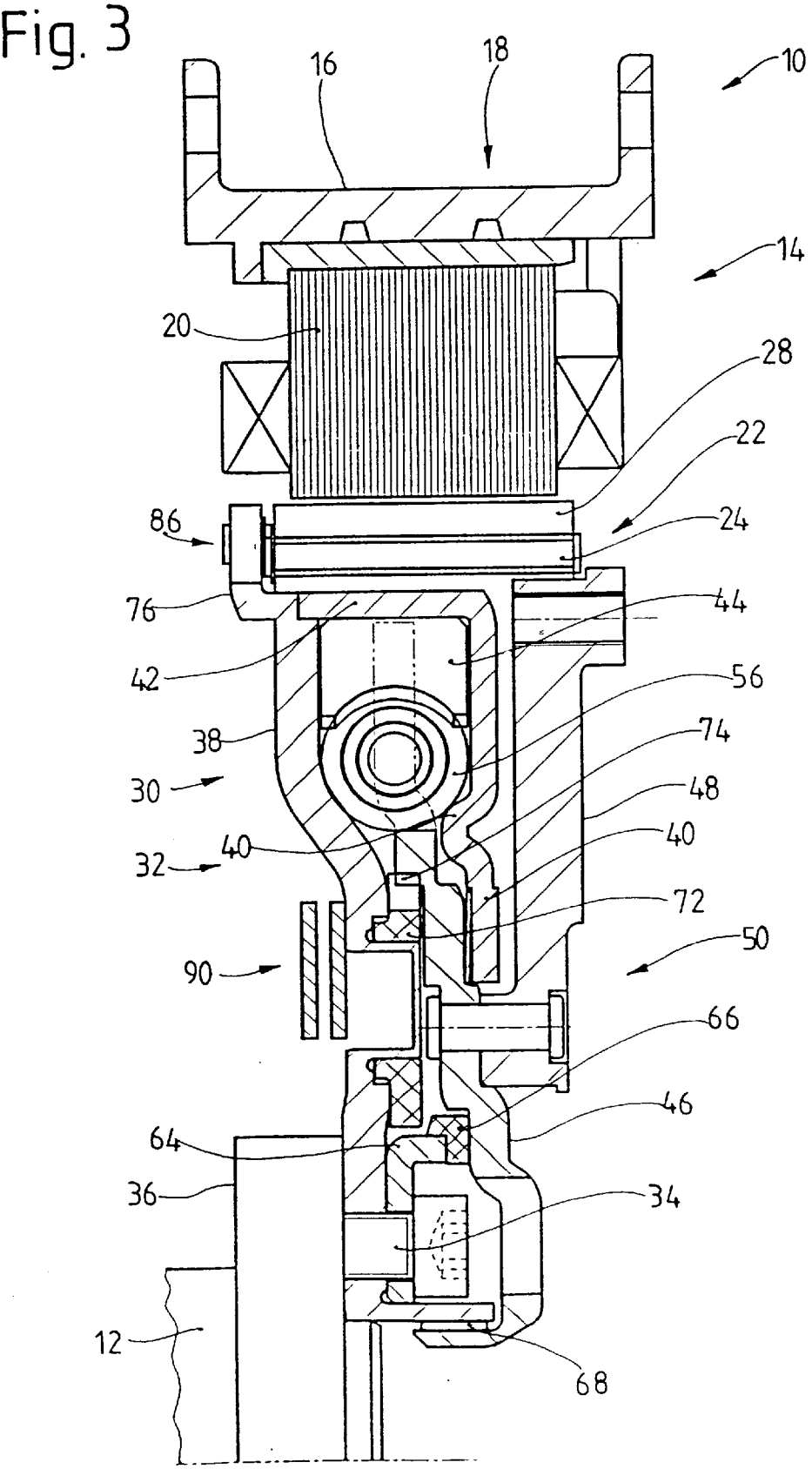
FIG. 3 is a partial longitudinal sectional view of a alternative modified embodiment of the drive system according to the present invention.
Figure 4:
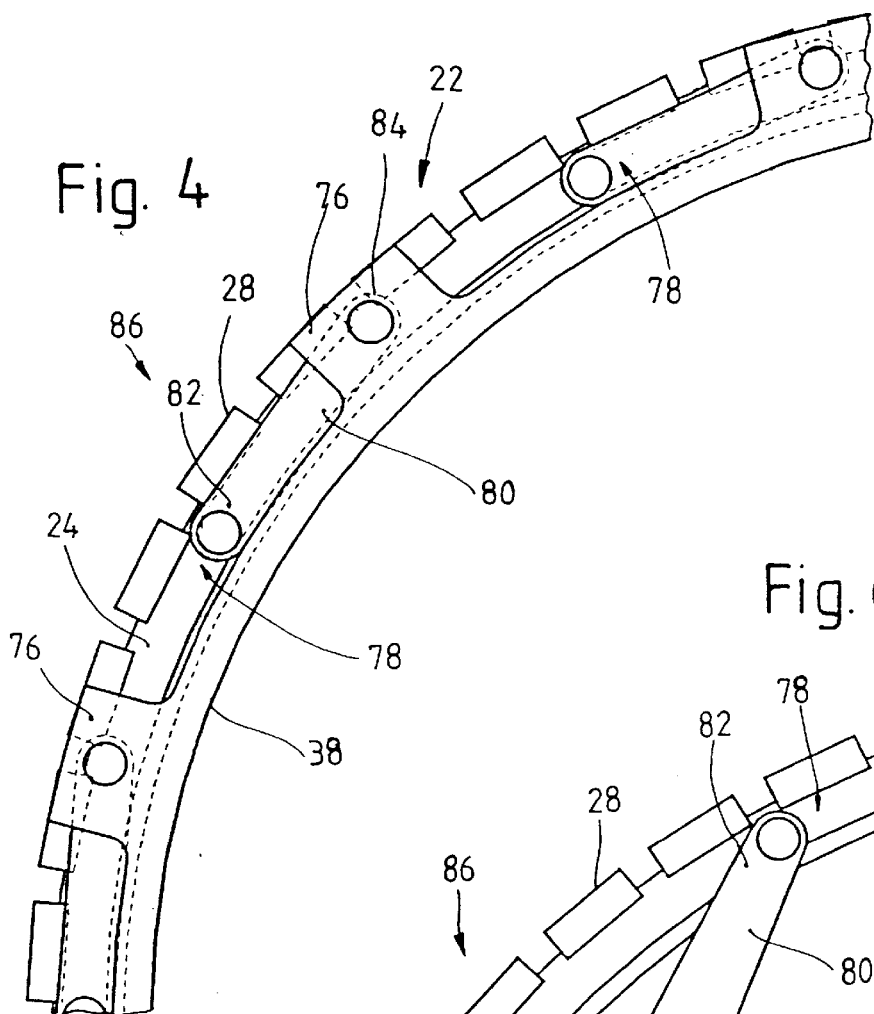
FIG. 4 is a partial axial view of the elastic deformation region of the drive system illustrated in FIG. 3.

A modification of the elastic connecting arrangement 86 between the rotor arrangement 18 and torsional vibration damper arrangement 32 is illustrated in FIGS. 3 and 4. Instead of the axial staggering of the electric machine 14 and torsional vibration damper arrangement 32 shown in FIGS. 1 and 2, a radial staggering the electric machine 14 and torsional vibration damper arrangement 32 is now provided. That is, the electric machine 14 is situated essentially radially outside the torsional vibration damper arrangement 32 so that the two functional regions of each are axially essentially completely overlapped. The electric machine 14 of FIGS. 3 and 4 is an internal-rotor machine and the stator arrangement 18 is supported radially outside the rotor arrangement 22 via the stator support 16 which may, for example, comprise an intermediate housing between an internal combustion engine and a gear box. The rotor arrangement 22 comprises a plurality of permanent magnets 28, arranged in succession on the rotor body 24 along the circumferential direction. The cover plate element 38 has a plurality of connecting sections 76 projecting radially outwards over the region of its connection to the cover plate element 40. The rotor body 24 has a plurality of mating connecting sections 78 which are situated in the radial region occupied by the rotor body 24 (i.e., they are not constructed as arm sections projecting radially outward or inward as in FIGS. 1 and 2). The first end regions 82 of the leaf spring elements 80 are once again fixed on the mating connecting sections 78 of the rotor arrangement 22, for example by riveting or other mechanical connection. Furthermore, the second end regions 84 of the leaf spring elements 80 are riveted on the connecting sections 76 or arranged thereon via some other mechanical connection. The modified arrangement of FIGS. 3 and 4 comprises the same elasticity of movement of the rotor arrangement 22 with reference to the torsional vibration damper arrangement 32 and the driveshaft 12 such that wobbling movements occurring in the region of the drive shaft 12 are prevented from causing relatively large variations in the air gap provided between the rotor arrangement 22 and the stator arrangement 18 which would entail a severe impairment of the operating characteristic of the electric machine 14.

In the modified drive system of FIGS. 3 and 4, the cover plate element 38 is screwed directly on the crankshaft flange 36 with the omission of any sort of spacing sleeve or the like by the screw bolts 34. The design of the torsional vibration damper arrangement 32 corresponds essentially once again to the design previously described.

Figure 6:
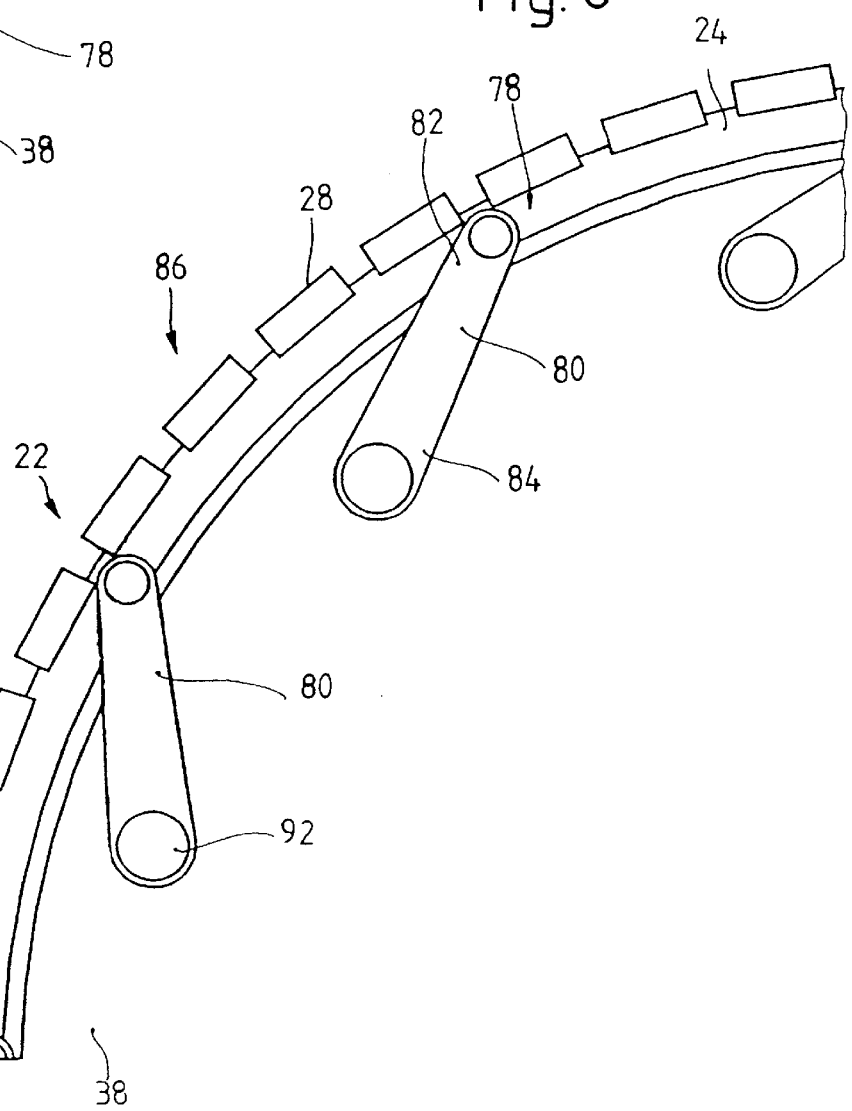
FIG. 6 is a partial axial view of the elastic deformation region of the drive system illustrated in FIG. 5.
Figure 5:
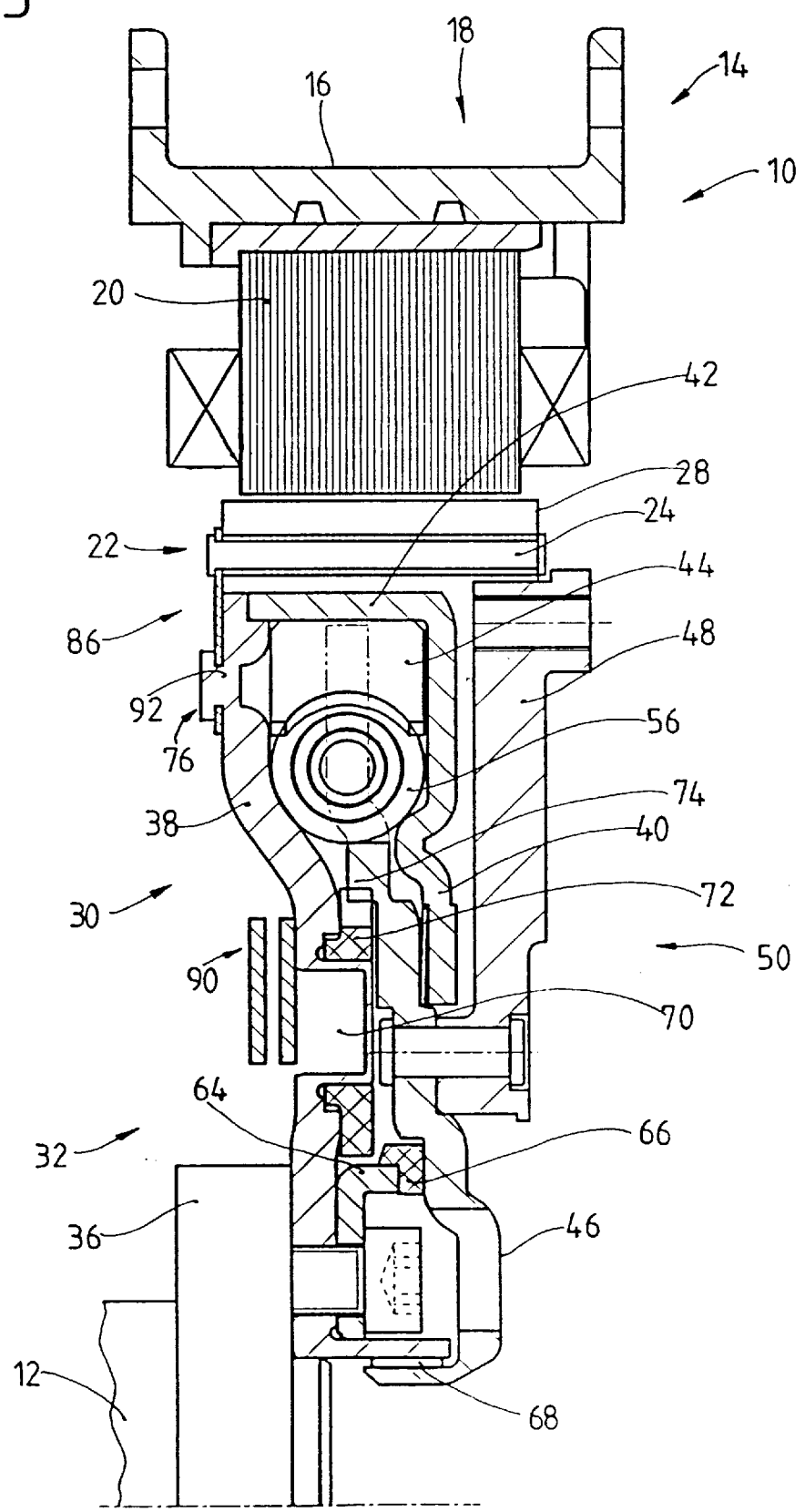
FIG. 5 is a partial longitudinal sectional view of an alternative embodiment of the drive system according to the present invention.

A further modification of the embodiment illustrated in FIGS. 3 and 4 is illustrated in FIGS. 5 and 6. The electric machine 14 of FIGS. 5 and 6 is once again constructed as an internal-rotor machine and the electric machine 14 and the torsional vibration damper arrangement 32 are staggered radially one above the other. The mating connecting sections 78 (see particularly FIG. 6) are constructed as sections which are positioned in radial region of the rotor body 24 and on which the leaf spring elements 80 may be permanently connected to the rotor body 24 via riveting, screwing or other mechanical connection. The connection of the leaf spring elements 80 to the rotor body may comprise, for example, rivets completely penetrating the rotor body 24 or axially projecting sections on the rotor body 24 which are pressed flat onto the first end regions 82 of the leaf spring elements 80 pushed thereon. In a corresponding way, no radially outwardly projecting connecting sections are now provided either on the torsional vibration damper arrangement 32, that is to say in the cover plate element 38 of the same. Instead of the connecting sections 76 shown in the previous embodiment, projections 92 are formed at the cover plate element 38 onto which the second end regions 84 of the leaf spring elements 80 are pushed. The projections 92 are subsequently pressed flat to obtain a rivet-like joining of the leaf spring elements 80 to the cover plate element 38. As shown in FIG. 6, the leaf-spring-type connecting elements 80 may extend both in the circumferential direction and in the radial direction. Elasticity between the rotor arrangement 22 and the crankshaft 12 is provided in the way which was described previously with reference to the embodiments of FIGS. 1 to 4.

The connecting arrangement 86 in which the elastic connecting elements 80 extend both in the circumferential direction and in the radial direction may also be provided with an external-rotor motor. The variant of the drive system 10 illustrated in FIG. 1 is advantageous here, however, since it is then possible to avoid mutual interference between the elastic connecting arrangement 86 and the coil ends of the stator coils 20.

Figure 7:
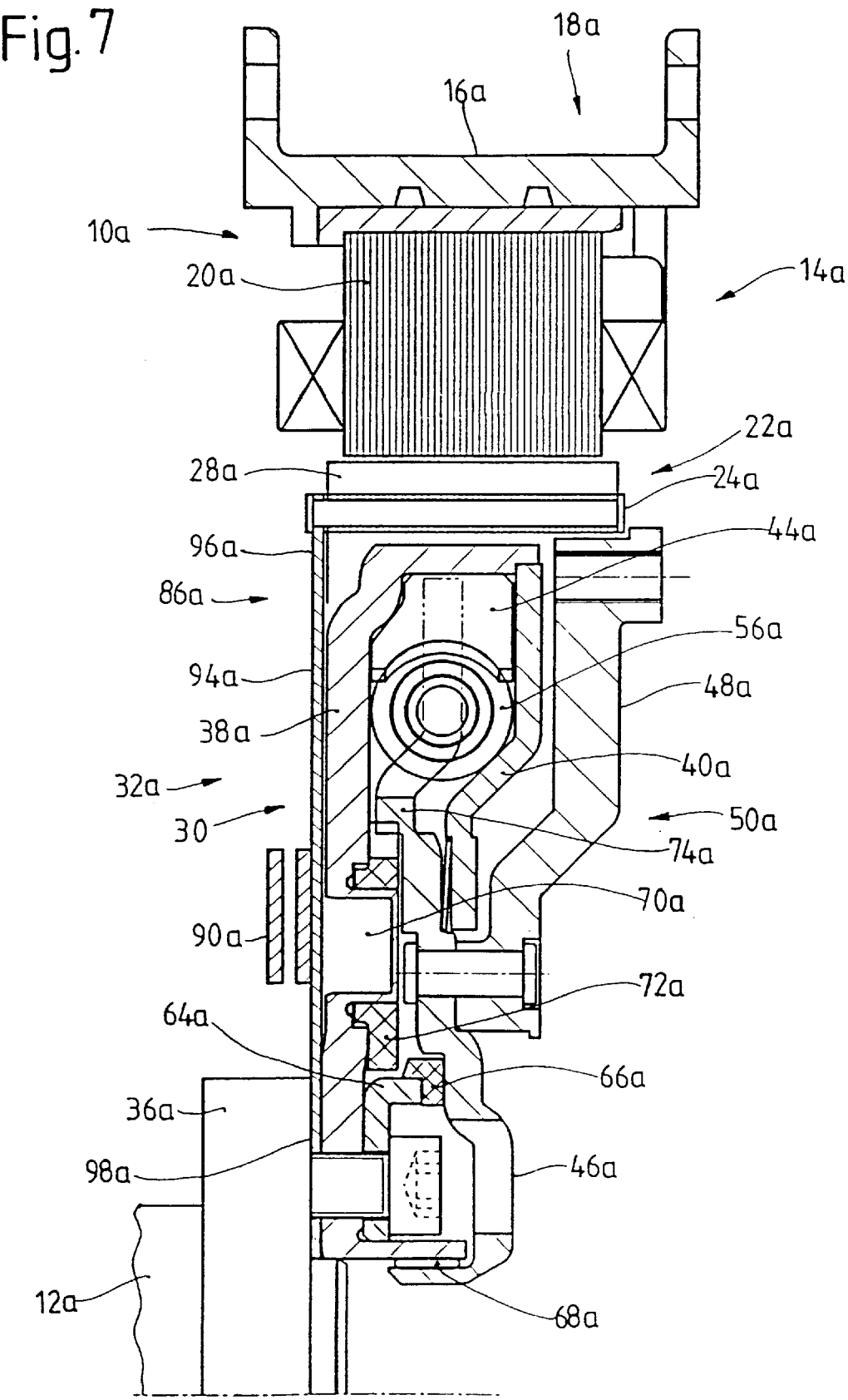
FIG. 7 is a partial longitudinal sectional view of an alternative embodiment of the drive system according to the present invention.

FIG. 7 shows an alternative embodiment of a drive system 10*a* according to the present invention. Components which correspond to previously described components with regard to design and function are denoted by the same reference numeral with the addition of a suffix "a". Essentially only the differences in function and design relative to the previously described embodiments will be considered below.

The drive system 10a of FIG. 7 includes an electric machine 14a with an internal-rotor machine with a permanently excited rotor arrangement 22a. The rotor arrangement 22a includes a rotor body 24a supporting permanent magnets 28a connected to a driveshaft 12a via an elastic connecting arrangement 86a so that the rotor arrangement 22a rotates with the driveshaft 12a. In this embodiment, the elastic connecting arrangement 86a directly connects the rotor arrangement 22a with the driveshaft 12a, i.e., the connection is not via the torsional vibration damper arrangement 32a as is the previous embodiments. Accordingly, the elastic connecting arrangement 86a comprises a connecting element 94a having a disk-like construction with a radially outer first end region 95a supportably connected to the rotor body 24a of the rotor arrangement 22a via riveting or other mechanical connection. A radially inner second end region 98a of the disk-like connecting element 94a is constructed for directly coupling onto the crankshaft flange 36a. For this purpose, the connecting element 94a is clamped between the cover plate element 38a of the torsional vibration damper arrangement 32a and the crankshaft flange 36a. The clamping force is produced by tightening the screw bolts 34a. That is, the connecting element 94a has a plurality of openings provided for the passage of the screw bolts 34a therethrough. The plural openings in the connecting element 94a allow the elastic connection of the rotor arrangement 22a to the driveshaft 12a to be independent of the torsional vibration damper arrangement 32a. Therefore, the torsional vibration damper arrangement 32a may be designed without consideration of any sort of measures for elastically joining on the rotor arrangement 22a. In principle, however, the design may also be described as previously with reference to FIGS. 1 to 6.

The elastic, disk-like connecting element 94a may be constructed as a continuous annular disk or as a disk element having a plurality of arm sections or segments. If it contains are section, the radially outer region of the arm sections may then be connected to the rotor arrangement 22a. A plurality of through openings or cut out regions may be introduced into the connecting element 94a to increase the elasticity of the same.

In each of the preceding embodiments described with reference to FIGS. 1 to 7, where the joining of the rotor arrangement to the driveshaft 12a is performed either directly or with the interposition of the torsional vibration damper arrangement, it is simultaneously ensured that it is also possible to produce magnetic decoupling of the rotor arrangement 22a, in particular of the permanent magnets and the rotor laminations serving as yoke, relative to other components. For example, it is possible to produce the rotor body from material of low permeability such as, for example, aluminum or other elements in which no problems arise with regard to welding onto other components or the like through the use of the riveted-on or screwed-on elastic connecting elements.

Figure 9:
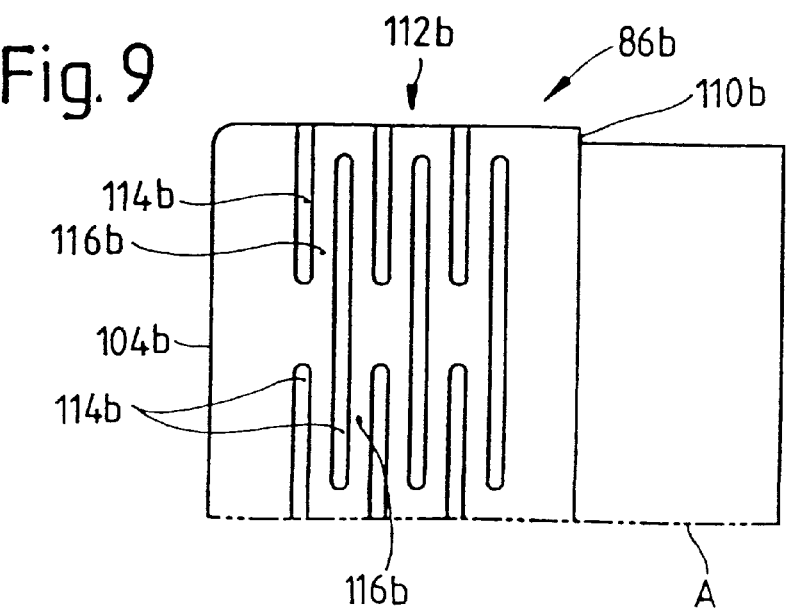
FIG. 9 is a partial radial view of an elastically deformable element via which the torsional vibration damper arrangement of FIG. 8 is connected to the driveshaft.
Figure 8:
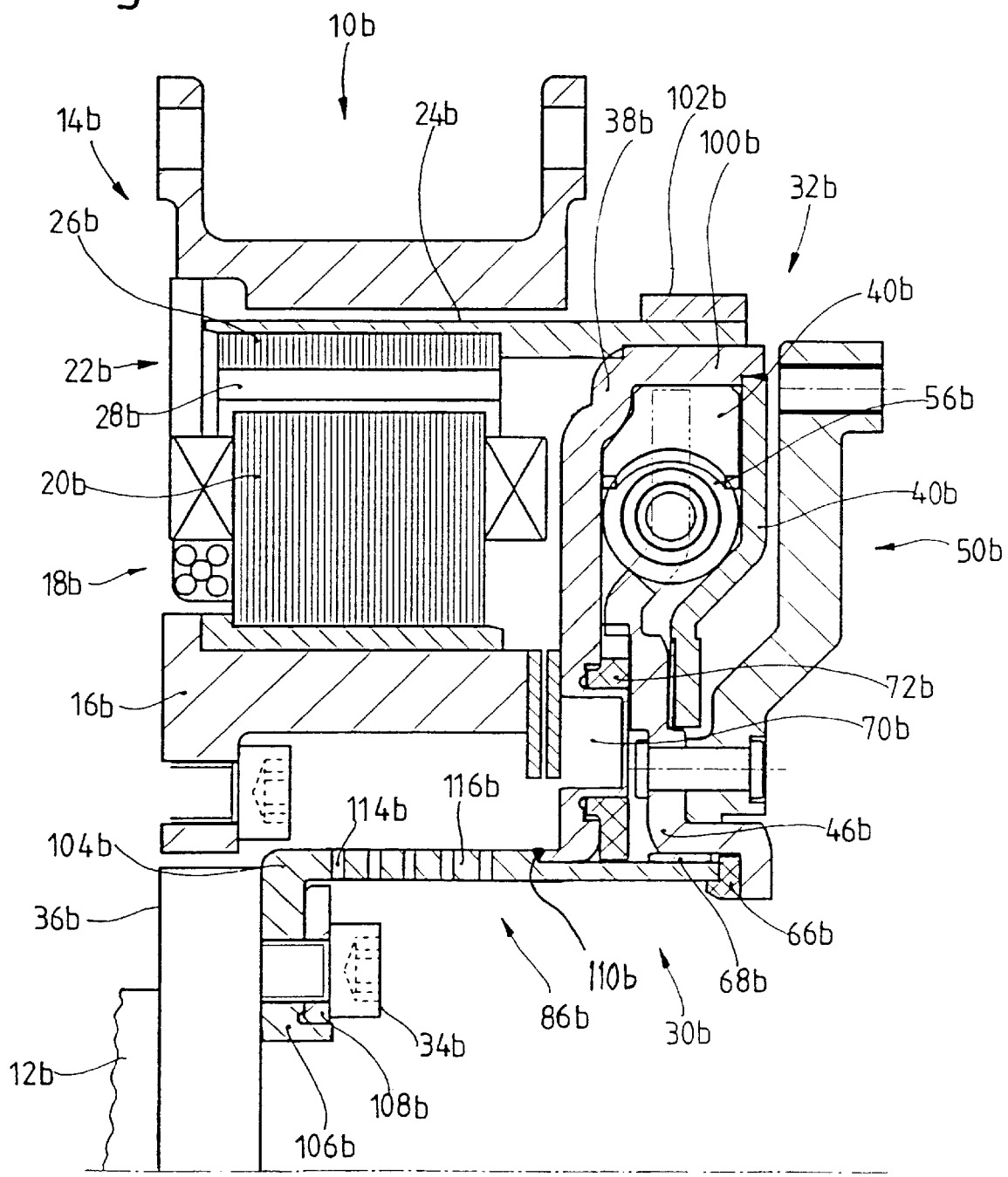
FIG. 8 is a partial longitudinal sectional view of yet a further alternative embodiments of the drive system according to the invention.

A further embodiment of a drive system 10b according to the present invention is illustrated in FIGS. 8 and 9. Components which correspond to previously described components with regard to design and function are described by the same reference numerals with the addition of a suffix "b".

In this embodiment of FIGS. 8 and 9, an electric machine 14b is constructed as an external-rotor machine with a permanently excited rotor arrangement 22b. The rotor arrangement 22b once again has a rotor body 24b which supports rotor laminations 26b on an inner circumferential surface thereof. The rotor body 24b may, for example, be permanently connected to the rotor laminations 26b by shrinking the rotor body 24b onto the rotor laminations 26b. Furthermore, the rotor body 24b may be fixed, for example likewise by being shrunk on, at its other axial end region on a cylindrical section 100b of a cover plate element 38b of the torsional vibration damper arrangement 32b. This cylindrical section 100b is then connected to the cover plate element 40b of the torsional vibration damper arrangement 32b, for example, by welding. The cylindrical section 100b may, of course, alternatively be constructed integrally with the cover plate element 40b. A fastening belt 102b surrounds the outside of the rotor body 24b in the region of the connection between the rotor body 24b and a primary side 30b of the torsional vibration damper arrangement 32b. The annular fastening belt 102b is formed, for example, from a steel band or similarly strong material and is likewise preferably shrunk on, thereby forming a connection between rotor arrangement 22b and torsional vibration damper arrangement 32b. The rotor body 24b may once again be formed from a material of lower magnetic permeability such as aluminum which may then be joined to the cover plate element 38b which may be formed from steel sheet. The joining of the rotor body 24b may be formed, for example, by the shrink joint in a fashion fastened by the belt 102b without welding.

As shown in FIG. 8, the primary side 30b of the torsional vibration damper arrangement 32b is joined to the crankshaft flange 36b and thus to the crankshaft 12b by a connecting element 104b which is fixedly connected to the cover plate element 38b, for example, by welding. The connecting element 104b may comprise a centering shoulder 110b in the region of the welded connection to the cover plate element 38b. The connecting element 104b is of essentially tubular design, i.e., comprises a cylindrical construction, and has in its end region near the crankshaft 12 a flange section 106b which projects radially inward and is screwed onto the crankshaft flange 36b via the screw bolts 34b with the interposition of a contact plate 108b. In its other axial end region, the connecting element 104b supports the central disk element 46b of the secondary side 50b of the torsional vibration damper arrangement 32b with the interposition of the axial bearing 66b and the radial bearing 68b. The connecting element 104b may be elastically deformed with reference to the axis of rotation A in the region between the connection to the crankshaft 12b and the welded connection to the cover plate element 38b. As shown in FIG. 9, a deformation slit arrangement 112b is arranged on the connecting element 104b which comprises a plurality of deformation slits 114b extending approximately in the circumferential direction. The deformation slits 114b are preferably positioned so that a plurality of such deformation slits 114b follow one another in the circumferential direction, and that a plurality of such deformation slits 114b also follow one another in the axial direction. In FIG. 9, groups of deformation slits 114b which follow one another directly in the axial direction have slots which are offset relative to one another in the circumferential direction so as to form a meandering pattern of connecting webs 116b which then provide the desired elasticity due to the thinner material. The elastic connecting arrangement 86b according to the embodiment of FIGS. 8 and 9 is provided in the region of the connection of the torsional vibration damper arrangement 32b to the crankshaft 12b, thereby providing a wobble decoupling between the torsional vibration damper arrangement 32b and the crankshaft 12b. However, at the same time the rotor arrangement 22b is also decoupled in this way from wobbling movements of the crankshaft 12b and can itself, in turn, be centered with reference to the stator arrangement 18b.

Instead of the deformation slit arrangement 112b, the connecting element 104b may be constructed like a bellows. That is, the connecting element 104b could be constructed with a corrugated wall structure to provide the desired wobble elasticity with reference to the axis of rotation A in conjunction, nevertheless, with a high stability of rotary connection.

Although the present invention was explained above with reference to an electric machine whose rotor arrangement is a permanently excited rotor arrangement, the principle of the elastic suspension of the rotor arrangement according to the present invention may also be applied to an asynchronous machine with a nonpermanently excited rotor.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive system for a motor vehicle, comprising an electric machine selectively operable in one of a starter mode for driving a drive shaft and a generator mode for obtaining electrical energy from rotation of the drive shaft, said electric machine comprising a stator arrangement, a rotor arrangement, and an elastic connecting arrangement connected to said rotor arrangement for rotation with said rotor arrangement about an axis of rotation, wherein said rotor arrangement is connectable to the drive shaft via said elastic connecting arrangement such that said rotor arrangement remains centered relative to said stator arrangement during wobbling of the drive shaft relative to said axis of rotation and such that said rotor arrangement is maintained in a fixed relationship with respect to rotation relative to said drive shaft.

2. The drive system of claim 1, wherein said elastic connecting arrangement comprises at least one elastically deformable connecting element.

3. The drive system of claim 2, wherein said at least one elastically deformable connecting element comprises a first end region supporting said rotor arrangement and a second end region operatively arranged for connection to the driveshaft.

4. The drive system of claim 3, wherein said second end region of said at least one elastically deformable connecting element is operatively arranged for direct connection to the driveshaft.

5. The drive system of claim 3, further comprising a supporting arrangement operatively arranged at said at least one elastically deformable connecting element so that said at least one elastically deformable connecting element is connectable to the driveshaft via said supporting arrangement.

6. The drive system of claim 5, wherein said elastic connecting arrangement comprises a plurality of elongated connecting spring elements arranged in succession in a circumferential direction, each of said elastically deformable connecting elements comprising a first end region connected to said rotor arrangement in a first radial region and a second end region operatively arranged for connection to the driveshaft, wherein said supporting arrangement comprises connecting sections assigned to said plural connecting spring elements and extending into said first radial region, and wherein said plural elongated connecting spring elements extend essentially in the circumferential direction.

7. The drive system of claim 6, wherein said supporting arrangement comprises a torsional vibration damper arrangement and wherein the connecting sections are arranged at a cover plate element of the torsional vibration damper arrangement.

8. The drive system of claim 5, wherein said elastic connecting arrangement comprises a plurality of elongated connecting spring elements arranged in succession in a circumferential direction, each of said elastically deformable connecting elements comprising a first end region connected to said rotor arrangement in a first radial region and a second end region operatively arranged for connection to the driveshaft, wherein said supporting arrangement comprises connecting sections assigned to said plural connecting spring elements and arranged radially inside of said first radial region, and wherein said plural elongated connecting spring elements extend in the circumferential direction and in the radial direction.

9. The drive system of claim 8, wherein said supporting arrangement comprises a torsional vibration damper arrangement and wherein the connecting sections are arranged at a cover plate element of the torsional vibration damper arrangement.

10. The drive system of claim 5, wherein said supporting arrangement comprises a torsional vibration damper arrangement.

11. The drive system of claim 1, wherein said elastic connecting arrangement comprises an elastically deformable connecting element in the form of a disk having a radially external first end region bearing said rotor arrangement and a radially internal second end region operatively arranged for connection to the driveshaft.

12. The drive system of claim 1, wherein said elastic connecting arrangement comprises a plurality of elongated connecting spring elements arranged in succession in a circumferential direction, each of said elastically deformable connecting elements comprising a first end region connected to said rotor arrangement and a second end region operatively arranged for connection to the driveshaft.

13. The drive system of claim 1, further comprising a torsional vibration damper, wherein said rotor arrangement is connectable to the driveshaft via said torsional vibration damper arrangement, and wherein said elastically deformable connecting arrangement is arranged in a region of the connection of the torsional vibration damper arrangement to the driveshaft.

14. The drive system of claim 13, wherein said torsional vibration damper arrangement comprises an elastically deformable connecting element operable for connecting said rotor arrangement to the driveshaft.

15. The drive system of claim 14, wherein said elastically deformable connecting element comprises a cylindrical deformation region.

16. The drive system of claim 15, wherein said deformation region comprises a deformation slit arrangement.

17. The drive system of claim 16, wherein said deformation slit arrangement comprises a plurality of deformation slits.

18. The drive system of claim 17, wherein said plural deformation slits extend in the circumferential direction and follow one another in at least one of axial succession and circumferential succession.

* * * * *